Oct. 28, 1952

R. ADLER 2,616,033

CONVERTER

Filed Dec. 24, 1948

2 SHEETS—SHEET 1

ROBERT ADLER
*INVENTOR.*

BY [signature]
HIS AGENT

Oct. 28, 1952 R. ADLER 2,616,033

CONVERTER

Filed Dec. 24, 1948 2 SHEETS—SHEET 2

ROBERT ADLER
*INVENTOR.*

BY Bruce L. Birchard

HIS AGENT

Patented Oct. 28, 1952

2,616,033

UNITED STATES PATENT OFFICE 2,616,033

CONVERTER

Robert Adler, Chicago, Ill., assignor to Zenith Radio Corporation, a corporation of Illinois Application December 24, 1948, Serial No. 67,231

12 Claims. (Cl. 250—20)

Figure 1:
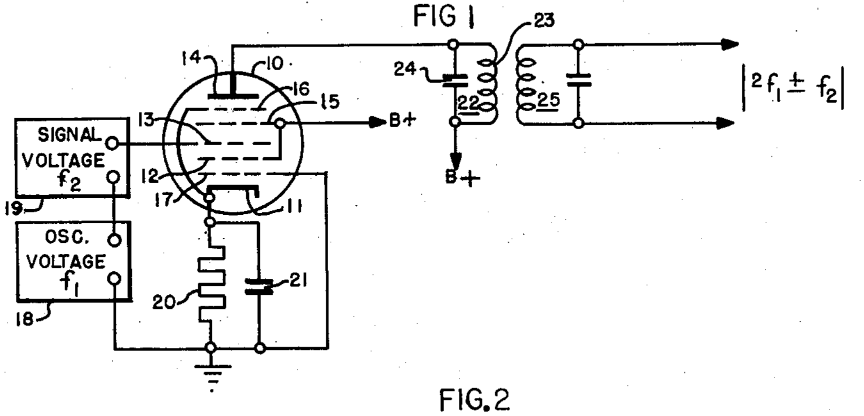

This invention relates to frequency converters and more particularly to such converters of the type embodying an electron discharge device.

In the reception of radio waves incorporating signal information modulated on a high frequency carrier, it is customary to heterodyn the incoming signal with locally generated oscillations in order to provide an intermediate frequency signal which is readily amplifiable before detection. When the carrier frequency is very high, the second or even a higher order harmonic of the local oscillator voltage is often used to mix with the incoming signal thereby to provide a signal at a desired intermediate frequency. The use of such harmonic conversion permits greater local oscillator stability than is obtainable with fundamental operation, due to the lower operating frequency of the local osillator.

When employing second harmonic conversion, it is desirable to suppress to as great an extent as possible any intermodulation products of the incoming signal and the fundamental frequency of the local oscillator. It is an important object of the present invention, therefore, to provide an improved converter which utilizes second harmonic conversion and in which intermodulation products of fundamental conversion are substantially rejected.

It is a further object of the invention to accomplish this desired result by utilizing an extremely small number of circuit components thereby to facilitate mass production on an economical basis.

In accordance with the invention, there is provided an electron discharge device having a cathode, an accelerating electrode followed by a control grid, and an anode. Locally generated oscillatory voltage of a first frequency and signal voltage of a second frequency are supplied to the control grid, and an output circuit selective to a frequency corresponding to an intermodulation product of the second frequency and the second harmonic of the first frequency is coupled between the anode and the cathode.

Figure 2:
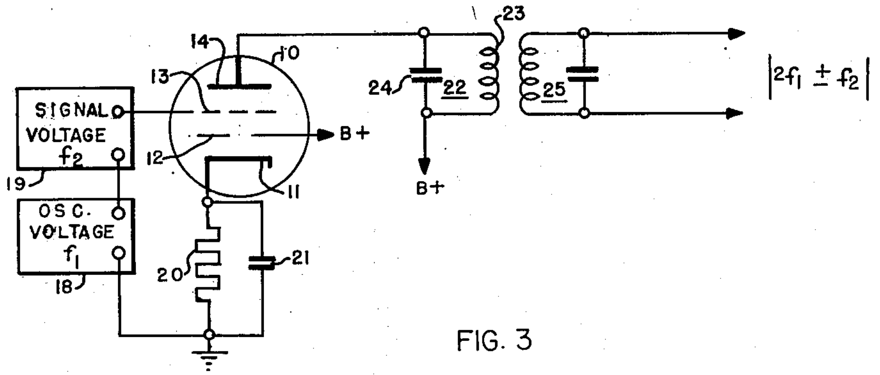
Figure 3:
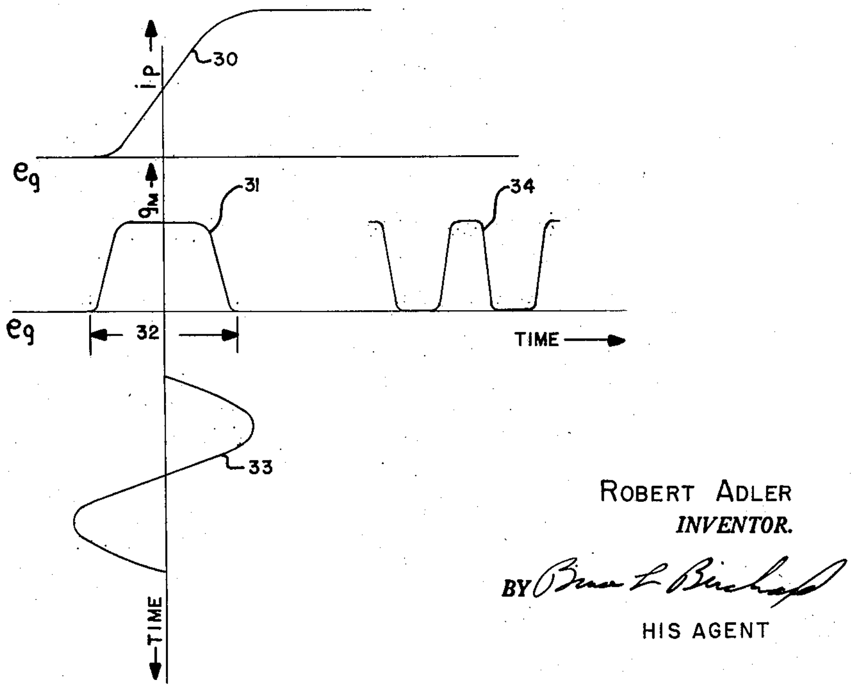

The features of the present invention which are believed to be novel are set forth with particularity in the appended claims. The invention, together with further objects and advantages thereof, may more readily be understood, however, by reference to the following description taken in connection with the accompanying drawings, in the several figures of which like reference numerals indicate like elements, and in which:

Figure 1 is a schematic representation of a converter circuit embodying the present invention, Figure 2 is a schematic diagram of a modification of the circuit of Figure 1, Figure 3 is a graphical representation of the manner of operation of the converters shown schematically in Figures 1 and 2, and Figures 4 and 5 are schematic representations of further embodiments of the invention.

With reference to Figure 1, there is shown an electron discharge device 10, which may be of the conventional pentagrid type, and which comprises a cathode 11, a control system comprising an accelerating electrode 12 followed by a control grid 13, and an anode 14. Accelerating electrode 12, here shown as a screen grid, is maintained at a unidirectional operating potential by connection to a suitable potential source, designated B+. If desired, a conventional screen grid 15 and suppressor grid 16 may be positioned between control grid 13 and anode 14.

An input circuit is coupled to control grid 13 and cathode 11 and comprises a source 18 of oscillatory voltage of a first frequency $f_1$ and a source 19 of signal voltage of a second frequency $f_2$. Oscillatory voltage source 18 may comprise, for example, the local oscillator of a conventional superheterodyne radio receiver, while signal source 19 may comprise, for example, the output circuit of a conventional radio-frequency amplifier. The input circuit may also comprise a cathode bias resistor 20 and associated bypass condenser 21 coupled between cathode 11 and ground. If discharge device 10 is of the conventional pentagrid variety, a first grid 17 is located between cathode 11 and accelerating electrode 12; in this event, grid 17 may be maintained at a small constant biasing potential, as for example, by connecting that grid to ground.

Positive unidirectional operating potential is supplied to anode 14 from potential source B+, through an output circuit 22 which is selective to a frequency corresponding to an intermodulation product of the signal frequency $f_2$ and the second harmonic of the local oscillator frequency $f_1$. Output circuit 22 may comprise a parallel resonant circuit including an inductor 23 and a condenser 24 and may be coupled to the input circuit 25 of a suitable intermediate-frequency amplifier (not shown).

The circuit of Figure 2 is substantially identical with that of Figure 1, electron discharge device 10 however, being of a special type which comprises a cathode 11, a slotted accelerating electrode 12 followed by a control grid 13, and an anode 14. Device 10 may, for example, be of the type disclosed and claimed in the copending application of Robert Adler, Serial No. 7,864, filed February 12, 1948, for Electron Discharge Devices, now U. S. Patent No. 2,511,143, issued June 13, 1950, and assigned to the same assignee as the present application.

The operation of the frequency-converting systems shown schematically in Figures 1 and 2 may be readily understood by reference to Figure 3. Curve 30 represents the control grid voltage-anode current characteristic of an electron discharge device in which a control grid follows an accelerating electrode, as for example device 10 of Figures 1 and 2. Curve 31 represents the control grid voltage-transconductance characteristic of the same tube and may be derived by plotting along the same abscissa the slope of the control grid voltage-anode current characteristic 30. It is to be noted that with a characteristic of the type of curve 30, which resembles a step function, the transconductance characteristic has a range 32 of high transconductance bounded on each side by a region of substantially zero transconductance.

In the operation of the circuit of Figure 1, cathode bias resistor 20 is so chosen that control grid 13 is biased to an operating point substantially in the center of range 32 of high transconductance. If now there is injected on control grid 13 (Figure 1) an oscillatory voltage of the form of curve 33, having a peak to peak amplitude greater than the width of high transconductance region 32, the transconductance variation of control grid 13 is represented graphically as curve 34 and has two positive peaks for each cycle of the local oscillator voltage.

When a signal voltage of frequency $f_2$ is concurrently injected on control grid 13, intermodulation occurs and the current to the anode 14 contains components corresponding to the intermodulation products $|2f_1 \pm f_2|$ of the second harmonic of the oscillator frequency $f_1$ and the frequency $f_2$ of the signal voltage. Output circuit 22 may be tuned to select any desired intermodulation component and is preferably tuned to the difference $|2f_1 - f_2|$ between the signal frequency $f_2$ and the second harmonic of the oscillator frequency $f_1$.

Purely by way of illustration, and in no sense by way of limitation, it has been found that with a suitably biased discharge device 10 of the type 6BE6, a local oscillator frequency of 55 megacycles per second, a signal frequency of 100 megacycles per second, and an output circuit 22 tuned to 10 megacycles per second, satisfactory second harmonic conversion is obtained and fundamental conversion is rejected by a factor of about 5 times. Thus it will be seen that the invention provides an improved converter which utilizes second harmonic conversion, and therefore affords the advantage of relatively great local oscillator stability, while substantially rejecting intermodulation products of fundamental conversion.

Figure 4:
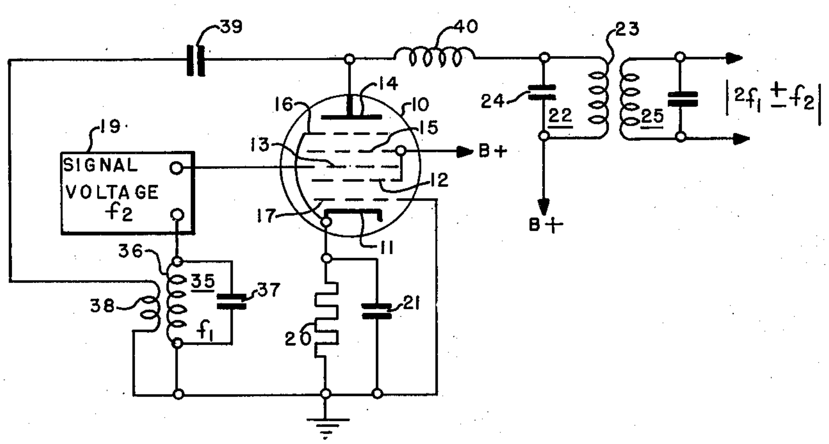

The circuit shown schematically in Figure 4 is a modification of the circuit shown in Figure 1, local oscillations being produced by the same electron discharge device in which conversion occurs. The input circuit comprises a parallel resonant circuit 35, including an inductor 36 and a condenser 37, and signal voltage source 19, and is coupled to control grid 13 and cathode 11. A feedback coil 38 is coupled between ground and anode 14 through a coupling condenser 39. A radio frequency choke coil 40, coupled between anode 14 and output circuit 22, serves to isolate circuit 35 from output circuit 22. In all other respects, the circuit of Figure 4 is identical with that of Figure 1.

With the arrangement of Figure 4, oscillations of a first frequency $f_1$ are induced in oscillatory circuit 35 as the result of feedback from anode 14 to control grid 13 through feedback coil 38 and oscillatory circuit 35. The oscillations appearing in circuit 35 are injected on control grid 13, thereby cyclically to vary the transconductance of control grid 13 with respect to anode 14 at a heterodyne frequency corresponding to the second harmonic of the frequency $f_1$ to which circuit 35 is tuned. Frequency conversion takes place in the manner explained in connection with Figures 1 and 3.

Figure 5:
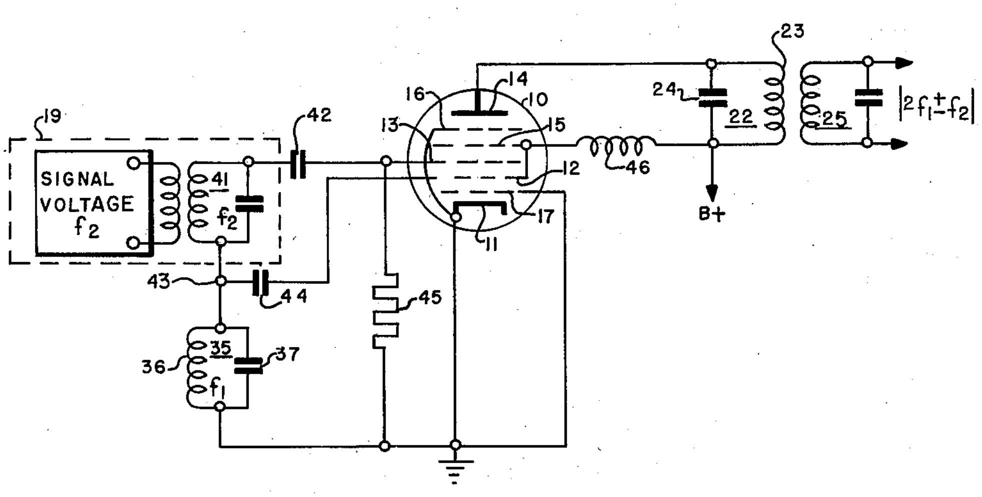

Figure 5 is a schematic representation of a modification of the circuit of Figure 4, local oscillations being induced in transitron fashion. Signal voltage source 19 includes a parallel resonant circuit 41 tuned to the signal frequency $f_2$ and coupled to control grid 13 by means of a coupling condenser 42. Accelerating electrode 12 is coupled to a junction point 43 between circuits 41 and 35 for voltages of frequency $f_1$; a blocking condenser 44 is included to prevent a substantial short-circuit between B+ and ground. A direct current return path is provided for control grid 13 by means of a grid resistor 45 coupled between control grid 13 and ground; cathode bias resistor 20 and bypass condenser 21 (Figure 4) are no longer necessary since sufficient bias voltage is provided by grid resistor 45. Oscillatory circuit 35 is effectively isolated from B+ by means of a radio frequency choke coil 46 coupled between accelerating electrode 12 and B+. In all other respects, the circuit of Figure 5 is identical with that of Figure 4.

Since circuit 41 is tuned to a frequency $f_2$ which is considerably different from the frequency $f_1$ to which oscillatory circuit 35 is tuned, circuit 41 offers substantially no impedance to voltages of frequency $f_1$. By the same token, circuit 35 affords a low impedance return to ground at frequency $f_2$. Therefore, it is seen that control grid 13 and accelerating electrode 12 are maintained at substantially the same potential for voltages of frequency $f_1$. With this arrangement, a negative resistance for currents of frequency $f_1$ is effected between accelerating electrode 12 and ground, and oscillations are induced in circuit 35 at a frequency $f_1$ in transitron fashion in a manner well-known in the art. Second harmonic conversion occurs as explained previously in connection with Figures 1 and 3.

While the invention has been shown and described in connection with certain present preferred embodiments thereof, it is understood that numerous variations and modifications may be made, and it is contemplated in the appended claims to cover all such variations and modifications as fall within the true spirit and scope of the invention.

I claim:

1. A frequency converter comprising: an electron discharge device having a cathode, a control system comprising an accelerating electrode followed by a control grid, and an anode; an input circuit coupled to said grid and said cathode and comprising a source of oscillatory voltage of a first frequency and a source of signal voltage of a second frequency; and an output circuit coupled to said anode and said cathode and selective to a frequency corresponding to an intermodulation product of said second frequency and the second harmonic of said first frequency.

2. A frequency converter comprising: an electron discharge device having a cathode, a control system comprising an accelerating electrode followed by a control grid, and an anode; an input circuit coupled to said grid and said cathode and comprising a source of oscillatory voltage of a first frequency and a source of signal voltage of a second frequency; and an output circuit coupled to said anode and said cathode and selective to a frequency corresponding to the difference between said second frequency and the second harmonic of said first frequency.

3. A frequency converter comprising: an electron discharge device having a cathode, a control system comprising an accelerating electrode followed by a control grid, and an anode; an input circuit coupled to said grid and said cathode and comprising a source of oscillatory voltage of a first frequency and a source of signal voltage of a second frequency; and an output circuit coupled to said anode and said cathode and comprising a parallel resonant circuit tuned to a frequency corresponding to an intermodulation product of said second frequency and the second harmonic of said first frequency.

4. A frequency converter comprising: an electron discharge device having a cathode, a control system comprising an accelerating electrode followed by a control grid, and an anode and thereby having a control grid voltage-transconductance characteristic which comprises a range of high transconductance bounded on each side by a range of substantially zero transconductance; an input circuit coupled to said grid and said cathode and comprising a source of oscillatory voltage of a first frequency, a source of signal voltage of a second frequency, and biasing means for biasing said grid at substantially the center of said high transconductance range, the peak to peak amplitude of said oscillatory voltage being greater than the width of said high transconductance range; and an output circuit coupled to said anode and said cathode and selective to a frequency corresponding to an intermodulation product of said second frequency and the second harmonic of said first frequency.

5. A frequency converter comprising: an electron discharge device having a cathode, a control system comprising an accelerating electrode followed by a control grid, and an anode and thereby having a control grid voltage-transconductance characteristic which comprises a range of high transconductance bounded on each side by a range of substantially zero transconductance; an input circuit coupled to said grid and said cathode comprising a source of oscillatory voltage of a first frequency, a source of signal voltage of a second frequency, and biasing means for biasing said grid at substantially the center of said high transconductance range, the peak to peak amplitude of said oscillatory voltage being greater than the width of said high transconductance range; and an output circuit coupled to said anode and said cathode and comprising a parallel resonant circuit tuned to a frequency corresponding to an intermodulation product of said second frequency and the second harmonic of said first frequency.

6. A frequency converter comprising: an electron discharge device having a cathode, a control system comprising an accelerating electrode followed by a control grid, and an anode and thereby having a control grid voltage-transconductance characteristic which comprises a range of high transconductance bounded on each side by a range of substantially zero transconductance; an input circuit coupled to said grid and said cathode and comprising a source of oscillatory voltage of a first frequency, a source of signal voltage of a second frequency, and biasing means for biasing said grid at substantially the center of said high transconductance range, the peak to peak amplitude of said oscillatory voltage being greater than the width of said high transconductance range; and an output circuit coupled to said anode and said cathode and comprising a parallel resonant circuit tuned to a frequency corresponding to the difference between said second frequency and the second harmonic of said first frequency.

7. A frequency converter comprising: an electron discharge device having a cathode, a control system comprising an accelerating electrode followed by a control grid, and an anode; an input circuit coupled to said grid and said cathode and comprising a parallel resonant circuit tuned to a first frequency and a source of signal voltage of a second frequency; means including said electron discharge device and said parallel resonant circuit for inducing oscillations in said circuit at said first frequency; and an output circuit coupled to said anode and said cathode and selective to a frequency corresponding to an intermodulation product of said second frequency and the second harmonic of said first frequency.

8. A frequency converter comprising: an electron discharge device having a cathode, a control system comprising an accelerating electrode followed by a control grid, and an anode; an input circuit coupled to said grid and said cathode and comprising a parallel resonant circuit tuned to a first frequency and a source of signal voltage of a second frequency; means including said electron discharge device and said parallel resonant circuit for inducing oscillations in said circuit at said first frequency; and an output circuit coupled to said anode and said cathode and selective to the difference between said second frequency and the second harmonic of said first frequency.

9. A frequency converter comprising: an electron discharge device having a cathode, a control system comprising an accelerating electrode followed by a control grid, and an anode; an input circuit coupled to said grid and said cathode and comprising a parallel resonant circuit tuned to a first frequency and a source of signal voltage of a second frequency; a feedback coil coupled between said anode and said cathode and inductively coupled to said parallel resonant circuit to induce oscillations therein at said first frequency; and an output circuit coupled to said anode and said cathode and selective to a frequency corresponding to an intermodulation product of said second frequency and the second harmonic of said first frequency.

10. A frequency converter comprising: an electron discharge device having a cathode, a control system comprising an accelerating electrode followed by a control grid, and an anode; an input circuit coupled to said grid and said cathode and comprising a parallel resonant circuit tuned to a first frequency and a source of signal voltage of a second frequency; a feedback coil coupled between said anode and said cathode and inductively coupled to said parallel resonant circuit to induce oscillations therein at said first frequency; and an output circuit coupled to said anode and said cathode and selective to a frequency corresopnding to the difference between said second frequency and the second harmonic of said first frequency.

11. A frequency converter comprising: an electron discharge device having a cathode, a control system comprising an accelerating electrode followed by a control grid, and an anode; a first parallel resonant circuit coupled between said accelerating electrode and said cathode and tuned to a first frequency; a second parallel resonant circuit coupled between said control grid and said accelerating electrode and tuned to a second frequency; means for effecting a negative resistance across said first parallel resonant circuit to induce oscillations therein at said first frequency; means for inducing in said second circuit a signal voltage of said second frequency; and an output circuit coupled to said anode and said cathode and selective to a frequency corresponding to an intermodulation product of said second frequency and the second harmonic of said first frequency.

12. A frequency converter comprising: an electron discharge device having a cathode, a control system comprising an accelerating electrode followed by a control grid, and an anode; a first parallel resonant circuit coupled between said accelerating electrode and said cathode and tuned to a first frequency; a second parallel resonant circuit coupled between said control grid and said accelerating electrode and tuned to a second frequency; means for effecting a negative resistance across said first parallel resonant circuit to induce oscillations therein at said first frequency; means for inducing in said second circuit a signal voltage of said second frequency; and an output circuit coupled to said anode and said cathode and selective to a frequency corresponding to the difference between said second frequency and the second harmonic of said first frequency.

ROBERT ADLER.

REFERENCES CITED

The following references are of record in the file of this patent:

UNITED STATES PATENTS

| Number | Name | Date |
|---|---|---|
| 1,793,959 | Powell | Feb. 24, 1931 |
| 2,033,986 | Harris | Mar. 17, 1936 |
| 2,051,178 | Roberts | Aug. 18, 1936 |
| 2,088,432 | Peterson | July 27, 1937 |
| 2,252,584 | Strutt | Aug. 12, 1941 |
| 2,260,844 | Thomas | Oct. 28, 1941 |
| 2,268,830 | Kleen | Jan. 6, 1942 |
| 2,285,030 | Haantjes | June 2, 1942 |
| 2,408,053 | Eyre | Sept. 24, 1946 |